UNITED STATES PATENT OFFICE.

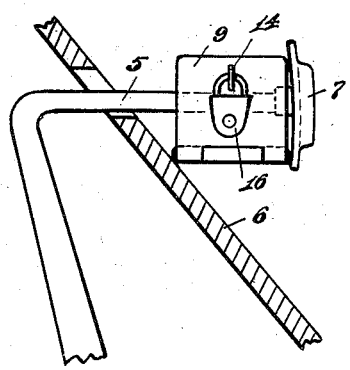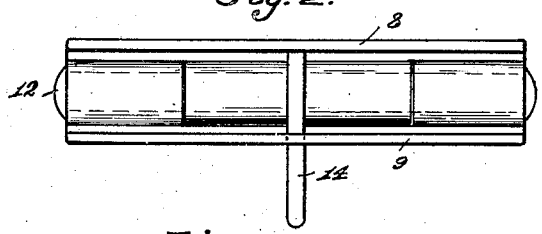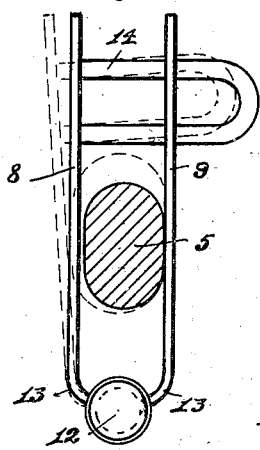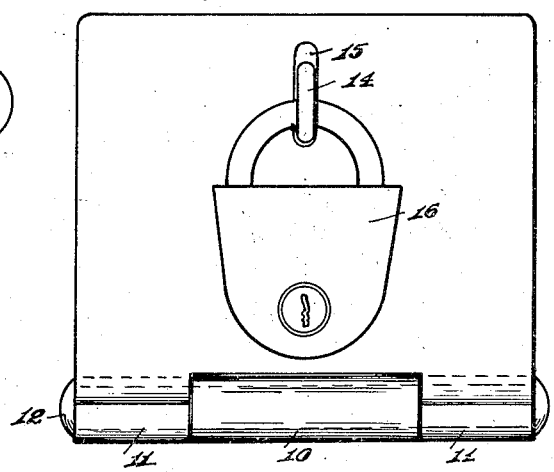

AUGUST K. GOEHNER, OF CLAY TOWNSHIP, ST. JOSEPH COUNTY, INDIANA.

CLUTCH-PEDAL LOCK.

1,427,285.  Specification of Letters Patent.  Patented Aug. 29, 1922.

Application filed October 8, 1919. Serial No. 329,288.

*To all whom it may concern:*

Be it known that I, AUGUST K. GOEHNER, a citizen of the United States, residing in Clay Township, in the county of St. Joseph and State of Indiana, have invented certain new and useful Improvements in Clutch-Pedal Locks, of which the following is a specification.

The invention relates to means for locking a depressible pedal against effective movement, and more specifically, to a lock particularly adapted to prevent actuation of the clutch pedal of an automobile.

The object of the invention resides in the provision of a lock for the clutch pedal of an automobile, whereby, with the gear shift lever in neutral position, the clutch cannot be thrown out to permit shifting of the transmission gears into operative relation, and thus prevent the unauthorized use or theft of the automobile. A further object resides in the provision of a lock for the purpose stated, which is adapted to fit about clutch pedals of varying cross-sectional dimensions, whereby a single size of lock will practically have universal application, and adapted for its purpose in connection with the many diverse sizes of clutch pedals employed by the different makes of automobiles. A still further object resides in providing a lock for the purpose noted, which is exceedingly simple, cheap of manufacture, and which may be handily applied or removed from the clutch pedal.

With the above and other objects in view, the invention in its preferred form of details will be described in the following specification, reference being had particularly to the accompanying drawings, in which:—

Figure 1 is a fragmentary view of a clutch pedal and foot board of an automobile showing the improved lock in operative position.

Figure 2 is a top view of the lock.

Figure 3 is an end elevation thereof shown applied to a pedal, which is shown in cross-section.

Figure 4 is a side elevation with applied padlock as used in connection with the lock.

Referring now more particularly to the said drawings, the reference character 5 designates the upper end of a clutch pedal of the general type commonly used on automobiles, the purpose of which is to permit the clutch being thrown out during the shifting of the transmission gears, all in the manner as is well understood in the art. It follows that, in order to start the automobile, it becomes necessary to shift the transmission shift lever from neutral to bring the gears in mesh, and it is the object to prevent throwing out of the clutch to permit shifting of the transmission gears, by interposing my improved lock between the foot board 6, and the pedal foot rest 7, as in the manner shown in Fig. 1.

The improved lock consists of a pair of heavy gage metal plates 8 and 9, formed with complementary knuckle portions 10 and 11 at one end thereof, which are hingedly joined by means of a pin 12, as plainly shown in Fig. 3. Said plates diverge or curve outwardly from the knuckles, as at 13, whereby to provide a wide separation thereof adjacent their hinged portions, so that the plates may straddle the clutch pedal in substantial parallelism, and may be applied to pedals of varying cross sectional dimensions without spreading the free ends thereof excessively, as shown by dotted lines in Fig. 4. Fixedly secured to one of the plates adjacent its free end, is a looped bolt or staple 14, which is adapted to be passed through an elongated slot 15 in the other plate, and held against retraction by any suitable key controlled lock, such as the padlock 16. In order that the pedal lock of a given size may have a wide range of effective adaptation to pedals of varying cross-sectional dimensions and form, a considerable margin of space is provided between the hinged end thereof and the staple, and as the latter may be of a length to permit a considerable margin of spread between the plates, a single sized lock will have a wide range of use, with the obvious advantages incident thereto.

It will be apparent from the foregoing that my improvement provides an exceedingly simple pedal lock, which does not require to be of a special size and form to fit many different sizes and forms of pedals, and which is cheap of manufacture as well as highly efficient for the use intended.

What is claimed is:—

The combination with the shank of a lever extending through an aperture in an inclined member disposed at an acute angle to the shank and extending downwardly and outwardly, said shank being provided with a right angularly disposed foot engaging tread, of a lever lock for said lever, said lock comprising two substantially rectangular shaped plates formed from spring material and hingedly connected together at their lower edges, and adapted to frictionally hold the shank, a staple carried by one of said rectangular shaped members and extending through an aperture in the other member and adapted to receive a lock, said rectangular shaped members being vertically disposed, and having their hinged points horizontally disposed, one end of the hinged side of the plates engaging the pedal, the other end of the hinged side engaging the inclined member and the upper outer corners of the plates engaging the tread of the lever.

In testimony whereof I affix my signature.

AUGUST K. GOEHNER.